United States Patent [19]

Eppich

[11] 4,084,214
[45] Apr. 11, 1978

[54] MODULAR HOUSING FOR ELECTRONIC APPARATUS

[75] Inventor: Helmut Eppich, West Vancouver, Canada

[73] Assignee: Ebco Industries, Ltd., Richmond, Canada

[21] Appl. No.: 686,243

[22] Filed: May 13, 1976

[51] Int. Cl.² ............................................. H05K 1/04
[52] U.S. Cl. .................................... 361/394; 16/172; 235/145 R
[58] Field of Search ............... 361/390, 391, 393, 394; 200/5 R, 295, 296; 220/337, 338, 340; 235/145 R; 312/7 R, 351; 174/52 R; 340/365 R, 365 S; 179/90 K, 179; 178/17 C; 16/172

[56] References Cited

U.S. PATENT DOCUMENTS

| | | | |
|---|---|---|---|
| 2,263,946 | 11/1941 | Fletcher | 16/172 |
| 2,858,016 | 10/1958 | Marano | 220/69 |
| 3,123,676 | 3/1964 | Prescott et al. | 340/365 R |
| 3,286,045 | 11/1966 | Clark, Jr. et al. | 200/295 |
| 3,342,190 | 9/1967 | Hultgren et al. | 220/338 |
| 3,515,809 | 6/1970 | Spraker | 179/90 K |
| 3,547,274 | 12/1970 | Sosinkski | 361/394 |
| 3,781,875 | 12/1973 | King | 317/101 DH |
| 3,941,951 | 3/1976 | Engstrom et al. | 179/179 |

*Primary Examiner*—David Smith, Jr.
*Attorney, Agent, or Firm*—Christensen, O'Connor, Johnson & Kindness

[57] ABSTRACT

A modular housing molded of a thermoplastic material and arranged for containing electronic circuitry is disclosed. The modular housing includes a box-like base unit, two removable modules, and a rear cover unit. The base unit forms a first housing for containing electrical apparatus. The upper surface of the base unit includes two tray-like recesses for receiving and containing the two modules which are configured for containing additional electronic apparatus. The base unit recesses and the modules are configured and arranged such that each module is securely retained within the base unit recesses without the use of conventional fasteners such as screws. The upper surface of the base unit also includes an additional tray-like recess in which the rear cover unit is mounted to form a compartment for containing additional electronic apparatus. Like the mounting arrangement for the two removable modules, the rear cover and the housing unit recess for the mounting thereof are arranged such that the cover unit is securely affixed to the base unit without the use of conventional fasteners. A removable dust cover is mountable to the base unit for protecting the assembled unit when not in use. When mounted to the base unit, the dust cover is swingable in an upward direction such that the assembled unit can be utilized without removing the dust cover from the base unit. In an arrangement of the invention wherein one of the removable modules includes a keyboard for manually supplying information to the electrical circuit contained within the module, a bezel is provided for preventing the simultaneous depression of more than a single key.

9 Claims, 22 Drawing Figures

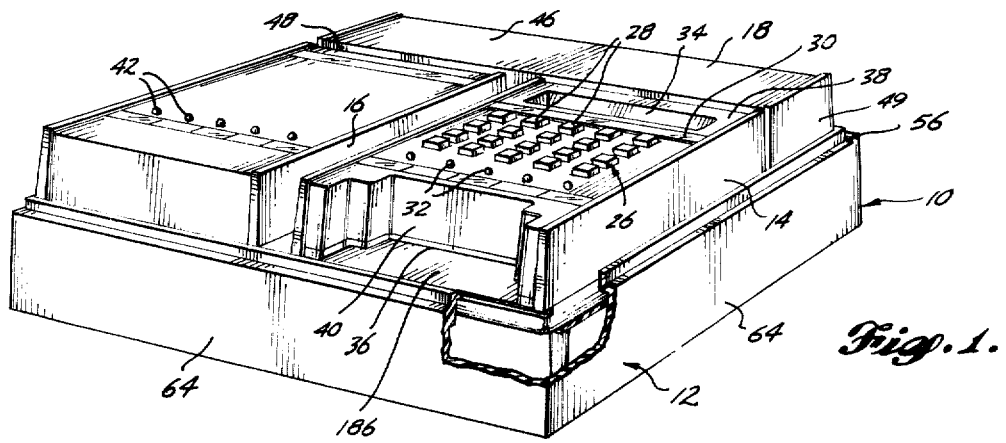
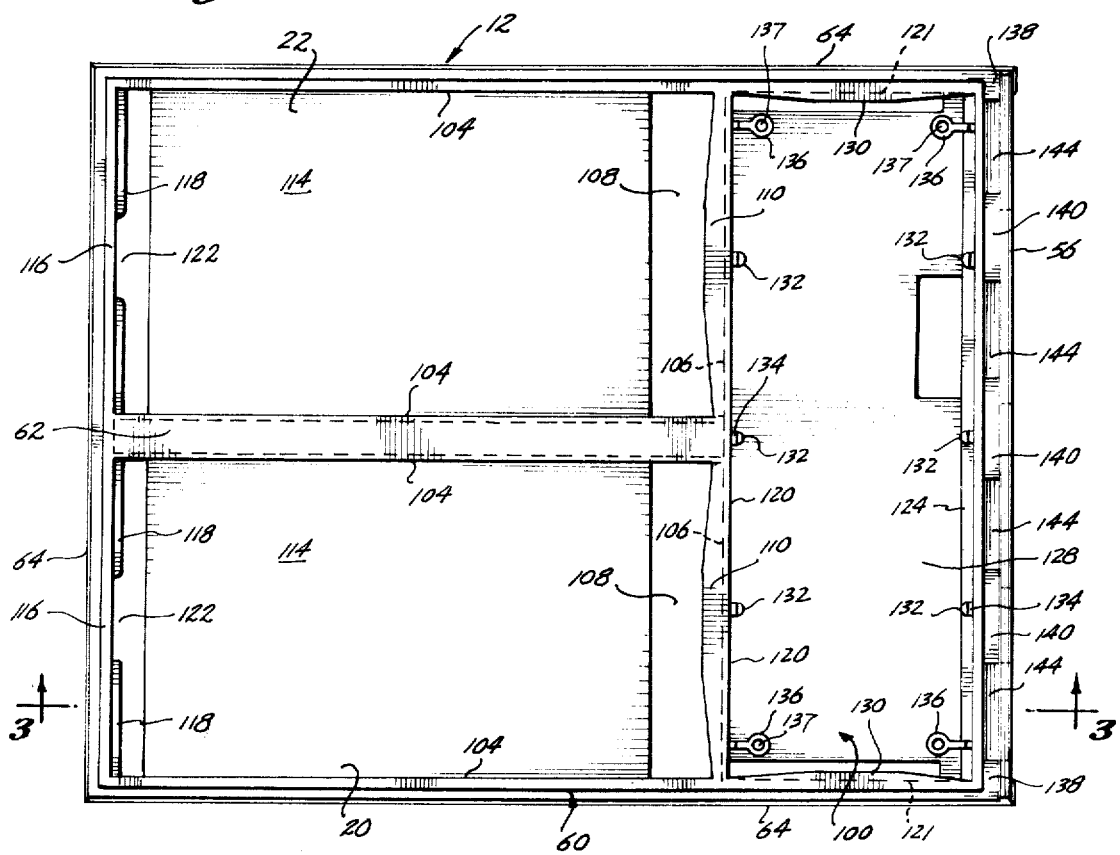
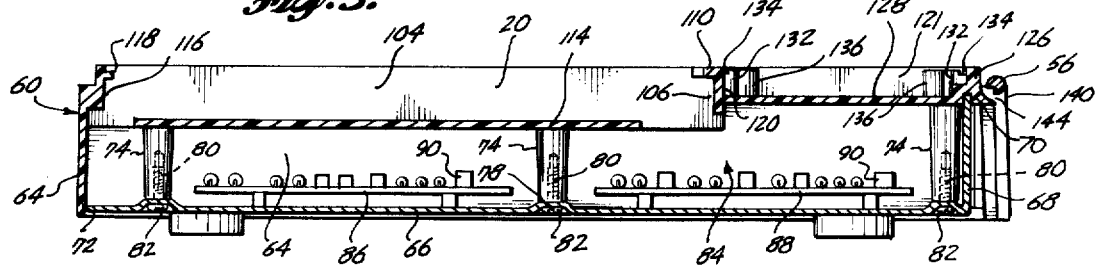

MODULAR HOUSING FOR ELECTRONIC APPARATUS

BACKGROUND OF THE INVENTION

This invention relates to modularized housing units for containing electronic circuitry or the like. More particularly, this invention relates to a modular housing arrangement wherein modular components containing various electronic circuits can be readily assembled with one another to form a variety of electronic apparatus.

The concept of modular design includes a wide variety of situations in which essentially physically independent units are arranged for assemblage with one another to form a total apparatus. Relative to electronic circuitry and the packaging thereof, modular construction generally includes the partitioning of the overall electronic apparatus into subassemblies of functionally related electrical components with each subassembly being packaged as a module arranged for structural and electrical interconnection with other modules to form the desired apparatus. In one application of modular packaging of apparatus such as electrical circuitry that is especially relevant to this invention, the modules are arranged such that the total apparatus formed by the combination of the various modules is adaptable to various situations. That is, the modules can be selected from a number of standard modules and assembled to provide an apparatus having selected desired features, or even a different function, without fabricating separate apparatus to provide each desired feature or function. Quite commonly, such a packaging arrangement is effected by packaging circuitry or apparatus that is common to each of the desired configurations within a main housing unit that is adapted for receiving one or more modules having a common structural configuration but containing variously configured internal apparatus.

Such a modular arrangement is advantageous both from the standpoint of the apparatus manufacturer and the user of the equipment. For the manufacturer, modularized packaging reduces the number of component parts that must be manufactured and inventoried while simultaneously permitting the manufacturer to supply a customer with desired equipment in the shortest possible time. For the user of such equipment, modularized packaging increases servicability since equipment can often be repaired by simply replacing the defective module without removing the apparatus from service for an extended period of time. Further, the customer's equipment inventory is often reduced since a single main housing can be used to effectively form various equipment configurations simply by installing appropriate modules.

Although the benefits of modular packaging are easily recognizable, a number of drawbacks relative to prior art modular construction has inhibited or prevented the full utilization of such packaging in certain instances. One example of such a situation is in the field of electronic data processing and, more particularly, the construction of data terminals for the collection and processing of information.

In this respect, recent advances in the fields of silicon integrated circuits, display devices, and data entry means such as keyboards have created the capability of producing a compact data terminal for the processing of data. Such data terminals often serve as an interface between an operator and a large data processor or computer with the data terminal coupled to the processing system by conventional data transmission links such as a dedicated data bus or a telephone circuit. Additionally, such data terminals can be configured to effectively form a small self-contained computing unit. Since each arrangement of such a data terminal can include various combinations of data input devices such as a card reader or keyboard and various display devices such as numeric displays and various arrangement of indicator lamps, it can be easily recognized that a modular packaging arrangement can provide a means for producing the data terminal that can be tailored to meet the requirements of various users of such equipment.

Although the basic principles of prior art modular arrangements are directly applicable to the realization of apparatus such as a data terminal, the use of prior art arrangements would not result in the most advantageous packaging arrangement. For example, both the prior art modularized electronic equipment and the prior art data terminals generally have been designed for handling and use by personnel trained in the operation and care of such equipment. Further, such equipment has generally been designed for use in a laboratory or office environment where the equipment is not likely to be subjected to relatively rough handling or contaminants such as dust, dirt, or grease. Hence, although equipment such as data terminals are directly applicable to operations conducted within factories, foundries, and at outdoor construction sites, the prior art modular housing arrangements are not amenable to operation in such an environment nor amenable to operation and handling by personnel whose skills do not include the operation and care of somewhat delicate electronic equipment. Additionally, a significant portion of the modular housing arrangements contained within the prior art comprise fairly complex structural arrangements. For example, the modules are often fabricated of a number of component parts and are mounted to a main unit by means of rather complex fastening apparatus such as a captive screw arrangement. Such fabrication is costly to manufacture, thus increasing the cost of, or even preventing the application of modularized construction.

Accordingly, it is an object of this invention to provide a modularized housing for containing electrical apparatus or the like that is applicable to a wide variety of uses.

It is another object of this invention to provide a rugged modular housing unit for protecting the apparatus contained therein when the unit is utilized in a variety of different environments.

It is still another object of this invention to provide a rugged modular housing for protecting the apparatus contained therein such that the unit can be operated by and handled by personnel having a range of skill and training.

It is yet another object of this invention to provide a modular housing unit wherein the various modules can be easily removed and installed for servicing or adapting the equipment to a variety of uses.

Still further, it is an object of this invention to provide a modular housing unit amenable to economic production wherein the modular components are of simple construction and are arranged to interconnect with one another to effectively form a single unit without the necessity of conventional fasteners such as screws.

SUMMARY OF THE INVENTION

These and other objects are achieved in accordance with this invention by a modular housing unit that includes a base unit, one or more modular housing units and a modular cover unit. The base unit forms a box-like container suitable for the mounting of components that are common to the operation of each configuration of the apparatus to be formed by the assembled modularized equipment, e.g., an electronic power supply, fuses, power switches, and interconnecting cabling and connectors. The upper surface of the base unit includes a rectangular tray-like recess for receiving and containing each modular housing that is used in conjunction with the base unit to form the complete apparatus. Tabular portions of two oppositely disposed edges of each rectangular recess are arranged to project inwardly over the recessed region.

Each modular housing that is placeable within a recessed region of the base unit is a rectangular shell with an interior region suitable for containing various components that function in cooperation with the components contained in the base unit. Each module has a length and width dimension that is substantially commensurate with the respective length and width dimension of each rectangular recess of the base unit.

Because of the inwardly extending tabular projections, a module cannot be placed in a recess by inserting the module into the recess with the bottom surface of the module substantially parallel to the plane of the opening formed by the recess. To permit insertion of the module in a base unit recess, and to captively retain the module within the recess, once it is inserted, each module includes a groove along the two outside end surfaces thereof that are arranged for engagement with the base unit tabular projections. More explicitly, those end faces of the module that adjoin the recess walls having the tabular projections when the module is placed in the base unit each include a horizontal groove that is dimensioned for receiving the tabular projections. Relative to the height dimension of the module, the grooves are positioned such that the bottom surface of the module contacts the lower surface of the recess when the module is placed into the recess. To install the module, the module is angularly inserted in the recessed opening such that one tabular projection extends into the mating groove in the module. The module and the recessed opening are dimensioned such that when the tabular projection is fully engaged with the groove, the second tabular projection of the recessed opening prevents the module from dropping into the recessed opening. To cause the module to enter the opening, the module is pushed firmly downward or toward the first tabular projection. This pressure causes the module wall that is engaged with the tabular projection to be elastically deformed or flexed inwardly, allowing the module to fully enter the recessed opening. As the module enters the opening, the second groove engages with the second tabular projection and the module is effectively locked into place. Since the module and the opening are dimensioned so that the tabular projections maintain a slight compressive force between the opposite end walls of the module, the module is securely retained within the recess and does not move about even though the assembled housing may be subjected to vibration or other mechanical forces.

To remove a module, the end face that is engaged with the second tabular projection is pressed toward the opposite wall of the recess and the module is pivoted upwardly so that the module is disengaged from the second tabular projection. The module is then easily withdrawn from the opening for servicing or replacement by another module. In the preferred embodiment, the first tabular projection is an inwardly extending portion of the base unit upper surface and the second tabular projection is a ridge, or small rail, mounted along the recess wall that is oppositely disposed relative to the wall having the tabular projection.

The modular cover unit is mounted in combination with another rectangular recessed opening in the upper surface of the base unit to form an enclosed compartment for containing additional equipment components. Basically the cover unit is a box-like structure that forms the upper surface and each side surface of the compartment that is defined when the cover unit is mounted to the upper surface of the base unit. The recessed opening for receiving the cover unit includes two tabular projections similar to the tabular projections of the recessed openings for receiving modules. The tabular projections are mounted along the upper edge of two oppositely disposed walls of the rectangular recess and extend inwardly toward the center of the recess. Two oppositely disposed walls of the modular cover unit are formed such that a horizontal groove, dimensioned for engaging with the tabular projections is defined along the lower edge of the walls. The cover unit is dimensioned such that when one of the grooves is engaged with one of the tabular projections during the installation of the cover, the opposite wall must be pushed inwardly to slightly deform the cover unit such that the second groove will engage with the second tabular projection. As in the case of the modules, the recess and the modular cover unit are dimensioned such that the installed cover unit is subjected to a slight compressive force when mounted to the base unit to securely interlock the two units. In addition, each of the two oppositely disposed cover unit recess walls that do not include the tabular projection include a number of spaced apart posts that project upwardly along the wall surfaces and define slots for receiving the walls of the cover unit. The slots are dimensioned to frictionally engage the lower portion of the cover unit walls to further retain the modular cover unit.

In a preferred embodiment of the invention, a removable dust cover is mountable to the base unit for protecting components that may be mounted in an exposed position on a module or the rear cover. The dust cover includes four side walls and an upper surface with the lower edge of the rear side wall arranged to define one portion of a hinge that detachably connects the dust cover to the base unit. The second portion of the hinge is defined by the upper rear edge of the base unit. When the dust cover is joined with the base unit, the dust cover is swingable from a closed position, in which the upper surface of the modular housing is fully enclosed, to an open position in which the dust cover is positioned at an obtuse angle relative to the upper surface of the base unit. The dust cover is maintained in this predetermined open position by a stop mechanism that is an integral portion of the hinge. Thus, when the equipment is utilized in surroundings wherein it is desirable to protect the equipment during periods of nonuse, the dust cover can be placed on the modular housing unit and simply opened to provide access to the equipment. Alternatively, when equipment is utilized in surroundings which present little or no possibility of contamination or damage, the dust cover can be completely removed from the modular housing unit.

In preferred embodiments of the invention in which at least one of the modules includes a keyboard having an array of buttons or keys, a bezel is included for mounting to the module to prevent multiple key depressions. Basically the bezel is a lattice-like rectangular grid including interstitial openings for each of the keys. When viewed in the cross-section, each grid element that partitions the bezel into the array of interstitial openings is beveled such that each interstitial opening converges downwardly from the opening in the upper surface of the bezel to an opening dimensioned for frictionally engaging with the keyboard buttons. When the bezel is mounted to the module, the upper surface of the bezel is located above the upper surface of the keys. Thus, when a particular key is depressed, the operator's finger is guided to the selected key by the sloping walls of the interstitial opening in which the key is positioned and the operator's finger is prevented from striking adjoining keys. Since the bezel is arranged to be easily mounted to and removed from a module that includes such a keyboard, the bezel can be installed or removed as desired. For example, in applications in which the equipment is operated by skilled personnel, it may be desired to remove the bezel, yet when the equipment is utilized by unskilled personnel, or utilized by personnel in an environment wherein heavy gloves are worn, the bezel can be installed for insuring that only a single key is depressed with each finger strike.

In accordance with this invention, the modules, the dust cover, the bezel and a major portion of the base unit are preferably molded of a plastic material such as a thermoplastic carbonate-linked polymer or a polycarbonate resin. Such thermoplastic material can be easily formed into the component parts of the invention by standard manufacturing techniques such as injection molding and further exhibits a degree of elastic deformation or resilience that effects the previously described interlocking of the component parts to interconnect the modular components without the necessity of additionally fastening devices.

BRIEF DESCRIPTION OF THE DRAWINGS

FIG. 1 is an isometric view depicting an assembled modular housing unit constructed in accordance with this invention;

FIG. 2 is a plan view of the base unit of the modular housing arrangement depicted in FIG. 1;

FIG. 3 is a cross-sectional side view of the base unit of FIG. 2 taken along the line 3—3;

DETAILED DESCRIPTION

Figure 4:
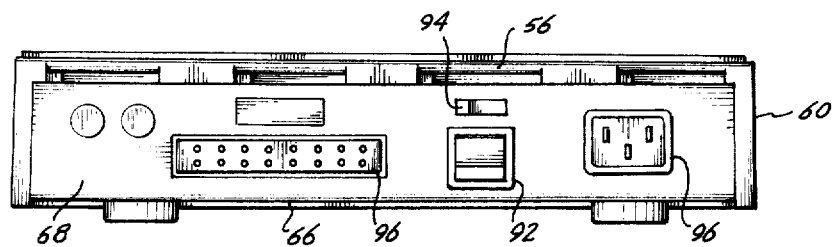
FIG. 4 is a rear elevation view of the base unit of FIG. 2 depicting the hinge rod for mounting a dust cover to the base unit.
Figure 5:
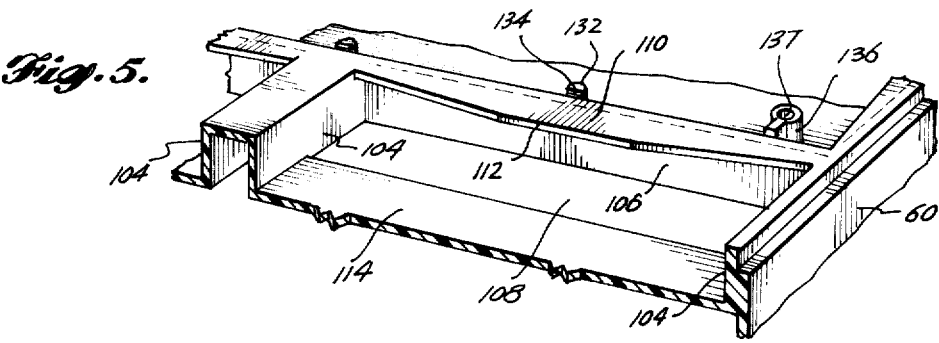
FIG. 5 is an isometric view of the tabular projections of the base unit of FIG. 2 that provide for captively retaining modules within the base unit.

FIG. 1 illustrates one embodiment of this invention arranged as a housing for a data terminal (denoted generally by the numeral 10). The arrangement of FIG. 1 includes a base unit 12, two modular housing units 14 and 16, and a modular cover unit 18. The base unit 12 is a box-like rectangular enclosure for containing a portion of the component parts that comprise the overall apparatus housed by the modular housing unit, e.g., the depicted data terminal 10. The upper surface of the base unit includes two rectangular recessed openings (20 and 22 of FIG. 2) that are configured for receiving and containing the box-like rectangular modules 14 and 16.

The modules 14 and 16 each contain various components which when electrically interconnected with the components contained within the remaining portions of the modular housing unit form the overall apparatus. For example, in the depicted embodiment, the module 14 includes a conventional keyboard 26 having a plurality of manually operable buttons or keys 28; a display region 30, including, for example, a plurality of conventional seven segment display devices; a plurality of indicator lamps 32 for displaying various information such as the operational status of the data system; and a manual card reader (148, FIG. 7) having a card inlet opening 34 in the upper surface 38 of the module 14 and a card outlet opening 36 in the forward end face 40 of the module 14. Such manual card readers for reading punched data cards are generally known in the art, with one such card reader, configured for reading conventional data cards inserted in the opening 34 and pulled from the opening 36 and also configured for reading punched identification badges or cards inserted in the opening 36, being disclosed in my copending application entitled "Manual Card Reader", Ser. No. 686,244 filed May 13, 1976.

In the depicted embodiment of the invention, the left hand module 16 includes a plurality of indicator lamps 42 mounted in alignment across the upper surface 44 of the left hand module. Such indicator lamps can serve, for example, to indicate various information coupled from a central data processor, (not shown) to the data terminal via a conventional data link that interconnects the data terminal 10 to the central processor.

Although the depicted modules 14 and 16 are structurally configured somewhat differently from one another and can contain completely different arrangements of component apparatus (e.g. electronic circuitry and interface devices such as keyboards, indicators, and switches), the lower regions of the modules 14 and 16 are substantially identical with one another so that either a module 14 or a module 16 will be received by and securely contained within either recessed opening 20 or 22 of the base unit 12. Thus, in accordance with this invention, a large number of differently configured data terminals can be formed by utilizing various modules 14 and 16 that contain different arrangements of electronic circuitry and installing the modules in various combinations within the upper surface recesses 20 and 22 of the base unit 12. For example, with respect to the depicted modules 14 and 16, some data terminal installations may require two modules 14 to be installed in the base unit or, alternatively, two modules 16. Further, the modules 14 and 16 can be realized in many variational forms to greatly increase the number of possible overall configurations. For example, the module 14, which includes the contoured end wall 40 that is configured to provide finger access to the card reader opening 36, can contain a card reader alone, or a card reader in combination with one or several other components, e.g., keyboard 26, display 30 and indicators 32. Further yet, the keyboard 26, display 30 and indicator lamps 32 can include a various number of keys, display elements and indicator lamps. In a similar manner, the module 16 can be configured in a variety of ways, containing various combinations of indicator lamps 42 and other components such as the keyboard 26 and the display 30 of module 14.

Hence, a great variety of data terminal configurations can be achieved simply by inserting modules 14 and 16 that contain the necessarily configured components into the recesses 20 and 22 of the base unit 12 and electrically interconnecting the modules with the base unit. Such electrical interconnection is advantageously effected by providing the modules 14 and 16 with electrical cables having connectors arranged for mating with electrical connectors contained within the base unit 12. As shall be described in detail hereinafter, when a module is installed within the base unit 12, the appropriate connectors are mated with one another and the module is effectively snapped into place in the appropriate recess of the base unit 12 and retained therein without the need of conventional fasteners such as screws.

The modular cover unit 18 includes an upper surface 46, two downwardly extending side walls 48, and two downwardly extending end walls 49. The cover unit 18 is mounted to form a rectangular compartment that extends substantially across the width of the base unit 12 at a location rearward of the modules 14 and 16. This compartment can be utilized for containing a variety of components with the upper surface 46 being utilized for the mounting of any number of devices such as indicator lamps. Hence, like the modules 14 and 16, the modular cover unit 18 can be variously configured to suit a variety of data terminal applications. Further, like the modules 14 and 16, the cover unit 18 is configured and arranged for easy installation and removal from the base unit 12. As shall be described in more detail hereinafter, a shallow recess (100, FIG. 2) in the upper surface of the base unit 12 is arranged for receiving and containing the modular cover unit 18 without requiring conventional fasteners such as screws.

A hinge rod 56, having a substantially circular cross-sectional geometry, is mounted across the upper rear edge of the base unit 12. As shall be described relative to FIGS. 16 through 22, the hinge rod 56 is configured for the mounting of a removable dust cover (FIG. 16) with the hinge rod 56 and the mating portion of the dust cover arranged such that an installed dust cover can be closed to fully cover the upper surface of the base unit 12, or be swung upwardly and maintained in a predetermined open position while the data terminal is utilized.

Referring now to FIGS. 2 through 5, the base unit 12 comprises a molded or formed upper shell 60 having an upper surface 62 and three downwardly extending walls 64. The upper shell 60 is mounted to a chassis or base pan 66 to form the base unit 12. More explicitly, the base pan 66 is a substantially flat metal plate having a flange 68 extending orthogonally upward along one edge thereof. The base unit upper shell 60 includes a rectangular slot 70 along the rear surface of the shell 60 immediately forward of the hinge rod 56. Additionally, the lower edge of each of the downwardly extending upper shell walls 64 includes a rectangular notch 72 extending the full length of the wall along the inside wall edge. As is most clearly shown in FIG. 3, the base pan 66 and the upper shell 60 are joined together to form the base unit 12 with the uppermost portion of the base pan flange 68 inserted in the slot 70 of the upper shell 60 and the outside edges of the unflanged portion of the base pan 66 nesting in the notches 72 of the three downwardly extending upper shell walls 64.

The base pan 68 is securely affixed to the upper shell 60 by conventional fastening techniques. For example, in the depicted embodiment, the upper shell 60 includes six spaced apart, downwardly extending screw posts 74 that are positioned to form two rows substantially parallel to and spaced apart from the two oppositely disposed upper shell longitudinal walls 64. The screw posts 74 extend downwardly in alignment with openings 78 in the base pan 66 with the lower portion of each screw post including an internally threaded hole 80. Screws 82 are installed through the opening 78 into the threaded openings 80 to securely affix the base pan 66 to the base unit upper shell 60.

When the upper shell 60 and the base pan 66 are joined together, a substantially closed compartment 84 is formed that is suitable for mounting apparatus that functions in common with the apparatus contained in the modules 14 and 16 to provide the desired equipment configuration. For example, in FIG. 3, circuit boards 86 and 88 are each mounted to the base pan by conventional fastening techniques. Each circuit board 86 and 88 can contain a variety of electronic circuits such as a power supply or digital memory and computing circuits designed to operate in conjunction with a variety of modules 14 and 16. Preferably, electrical connectors 90 are mounted on the circuit boards 86 and 88 (or, alternatively on electrical cables connected to the circuit boards 86 and 88) for electrically interconnecting the circuitry contained within the compartment 84 with the circuitry contained within the modules 14 and 16. Additionally, components can be mounted to extend through the rear wall of the base unit 12 that is formed by the flange 68 of the base pan. For example, in the depicted embodiment, a circuit breaker 92, a power switch 94 and two connectors 96 are mounted at convenient locations on the flange 68. The connectors 96 provide for the interconnection of the data terminal 10 with an appropriate source of power, and the interconnection of the data terminal to the data system in which the terminal is to be utilized.

The recesses 20 and 22, configured to receive and retain the modules 14 and 16, and a recess 100 configured to receive and retain the modular cover unit 18 are formed in the upper surface 62 of the base unit upper shell 60. Referring to FIGS. 2 and 3, the recesses 20 and 22 are substantially identical in configuration with the recess 20 being formed in the right hand portion of the upper surface 62 and the recess 22 being formed in the left hand portion of the upper surface 62 (relative to the orientation depicted in FIG. 1). The two recesses 20 and 22 are positioned adjacent one another with the recess sidewalls 104 substantially parallel to the downward extending longitudinal walls 64 of the base pan 66. The rear housing recess 100 extends across the upper surface 62 occupying the portion of the upper surface between the hinge rod 56 and the rear edges 106 of the recesses 20 and 22.

Each recess 20 and 22 forms a generally rectangular opening 108 when viewed from above (FIG. 2) with the upper shell 60 being formed to define the downwardly extending recess side walls 104 and the downwardly extending oppositely disposed end walls 106 and 116. The central portion of the rear edges 106 of the recesses 20 and 22 each include a tabular projection 110 that extends toward the center of the recess substantially parallel with the bottom surface 114 of the recess. As is shown in more detail in FIG. 5, each tabular projection 110 has an outer edge 112 that is substantially parallel to the recess end wall 106 over the central portion of the tabular projection 110. Each end portion of the tabular projection is contoured or tapered such that the outer edge 112 smoothly converges with the end wall 106 at the intersection of the end wall 106 with the sidewalls.

Referring again to FIG. 3, the forward wall 64 of the upper shell 60 also forms the forward end wall 116 of each recess 20 and 22. Ridges 118, having a substantially rectangular cross-section, are located along the recess forward end wall 116. The ridges 118 are substantially parallel to the recess bottom surface 114 and extend along the end wall 116 from each side wall 104 toward the longitudinal center line of the rectangular recesses 20 and 22, with a slot 122 being formed between the ends of the ridges 118 that are nearestmost to the recess longitudinal center line. As shall be discussed in detail with reference to FIGS. 10 and 11, the tabular projection 110 and the ridges 118 are dimensioned and arranged to securely retain the modules 14 and 16 within the recesses 20 and 22 of the base unit 12.

The rear housing recess 100 is formed in a manner similar to the recesses 20 and 22 to effectively define a rectangular tray-like recess extending across the width of the base unit 12 between the rearward edge of the recesses 20 and 22 and the hinge rod 56. More explicitly, the downward extending wall 106 that forms the rear end wall of the recesses 20 and 22 forms the forward sidewall 120 of the rear housing recess 100 with a rear sidewall 124 being formed by a downwardly extending flange 126. The flange 126 includes the slot 70 in the lower surface thereof for receiving the flange 68 of the base pan 66 and is also arranged to form the hinge rod 56. The two end walls 121 of the recess 100 are formed by the downwardly extending upper shell walls 64 that form the longitudinal walls of the base unit 12. The bottom surface 128 of the recess 100 is a substantially horizontal plane interconnecting the two sidewalls (120 and 124) and the two end walls 121.

The two end walls 121 each include a tabular projection 130 along the upper boundary thereof that projects inwardly over the recess 100. The tabular projections 130 are configured similar to the tabular projections 110 and retain the rear cover unit 18 when the cover is installed to the base unit 12. To further retain the rear cover unit 18, three posts 132 are uniformly spaced along each of the front and rear sidewalls (120 and 122, respectively) of the recess 100 for frictionally engaging the lower portion of the walls of the modular cover unit. Each post 132 extends upwardly along the associated side wall and forms a slot 134 with the upper boundary of the side wall that is dimensioned to frictionally engage the walls 48 of the cover unit 18.

Additionally, if desired, fastening means can be provided to prevent unauthorized removal of the rear cover unit 18. For example, in the embodiment depicted in FIGS. 2 and 3, screwposts 136 are included along the side walls 120 and 124 near each corner of the rectangular recess 100. The screwposts 136 are arranged to be in alignment with threaded screwposts included within the cover unit 18 such that retaining screws can be installed through appropriately sized central openings 137 within the screwposts 136 to further attach the rear cover unit 18 to the base unit 12.

The hinge rod 56 is preferably formed as an integral portion of the upper shell 60 of the base unit 12. Referring to FIGS. 2 and 3, the hinge rod 56 is substantially circular in cross section and extends across the upper edge of the rear wall of the base unit 12. The flange 126, which forms the rear wall 124 of the recess 100 and the slot 70 for containing the flange 68 of the base pan 66, extends rearwardly along each side of the base unit 12 to form end supports 138 that interconnect with and support the hinge rod 56. Further, the flange 126 is configured to form three spaced apart support blocks 140 that extend rearwardly between the rear edge of the base unit 12 and the hinge rod 56. The support blocks 140 are substantially rectangular in cross-section (FIG. 3) with the upper surface 142 of each support block intersecting the hinge rod 56 at a diameter thereof. Four open slots 144 are formed between the end supports 138 and the spaced apart support blocks 140. When viewed from above (FIG. 2), the slots 144 are rectangular openings between the rear edge of the base unit 12 and the hinge rod 56. When viewed in cross-section (FIG. 3), the slots 144 exhibit a curved geometry, being formed between approximately one quadrant of the circular hinge 56 and a radiused rear wall 146 of the flange 126. As shall be described in detail with respect to FIGS. 16 through 22, the slots 144 and the support blocks 140 are configured for attaching a dust cover (FIG. 16) to the base unit 12.

It can be ascertained from the above description that the upper shell 60 is arranged to form the described recesses 20, 22 and 100 and to form the hinge rod 56 in a single manufacturing step. In this respect, it has been found advantageous to injection mold the upper shell 60 from a thermoplastic carbonate-linked polymer or polycarbonate resin. Such materials are well known within the injection molding art with one of the better known tradenames being Lexan, which is a registered trademark of the General Electric Company of Schnectady, New York. As shall be discussed hereinafter, fabricating the upper shell 60, the rear cover unit 18, and the housing shells of the modules 14 and 16 with such a polycarbonate plastic material is further advantageous, since such fabrication results in each component part exhibiting a degree of resilience or flexibility that permits the component parts to be interlocked with one another to effectively form a single housing unit.

Figure 6:
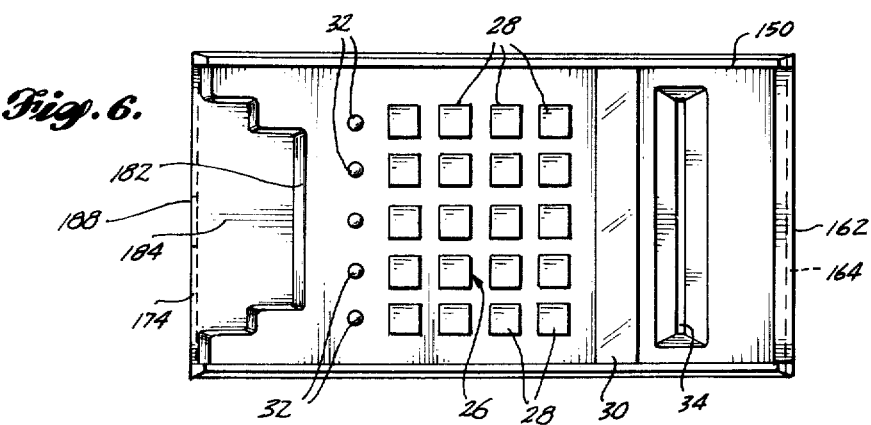
FIG. 6 is a plan view of a typical module of the embodiment of the invention depicted in FIG. 1.
Figure 7:
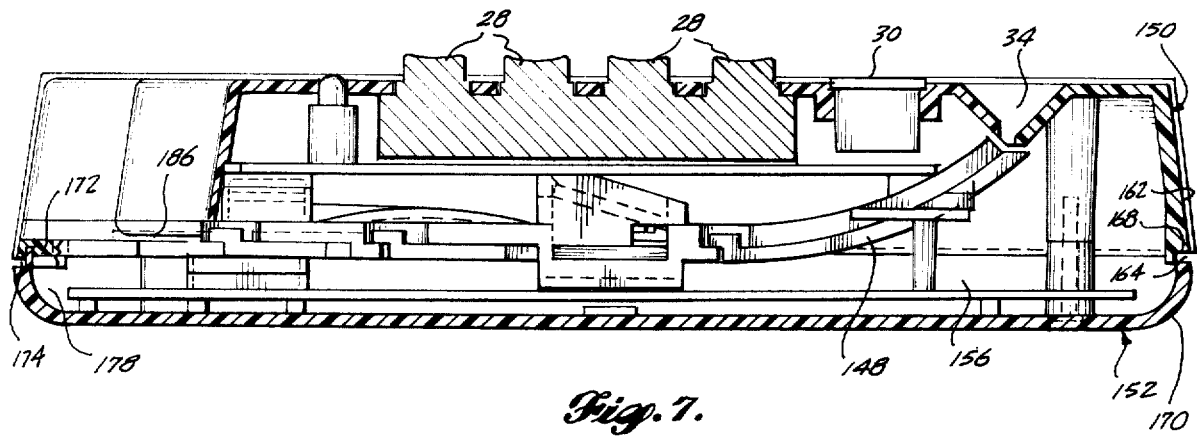
FIG. 7 is a side elevation view of the module of FIG. 6.
Figure 8:
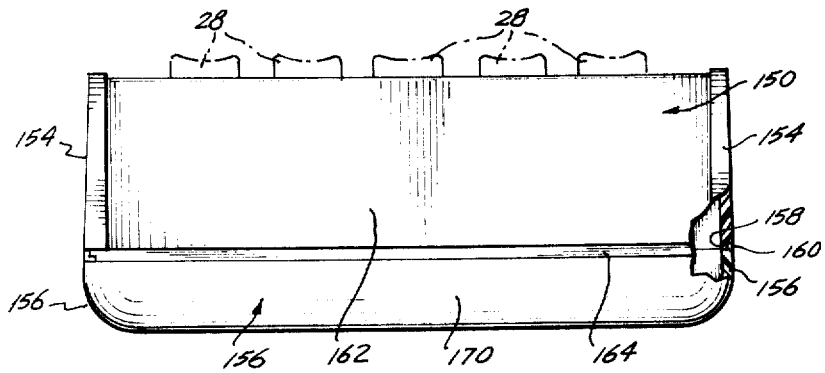
FIGS. 8 and 9 are end elevation views of the module of FIG. 6 that illustrate the grooves for engaging with the tabular projection and ridge of the base unit of FIG. 2.

As previously stated, the modules 14 and 16 are of substantially the same size and shape except for the provisions of end wall 40 of module 14 for accessing the card reader outlet 36. Referring to FIGS. 6 through 8 (which depict the module 14 of the embodiment of this invention depicted in FIG. 1), each module 14 or 16 is formed by an upper shell 150 and a lower shell 152. The upper and lower shells are arranged to engage with one another to effectively form a convenient housing for containing components necessary or desirable to adapt the components contained within the base unit 12 to the desired equipment configuration. For example, the module 14 depicted in FIGS. 6 and 7 includes a keyboard 26, a display unit 30 and indicators 32 which are useful in combination with the components within module 16 and the base unit 12 for forming a data terminal.

As shown in FIG. 8, the edges of the longitudinal walls 154 of the upper shell 150 and the longitudinal walls 156 of lower shell 152 respectively include rectangular notches 158 and 160 that run the entire length of the longitudinal walls. The notches 158 and 160 are dimensioned such that when the shells 150 and 152 are assembled to form the modules, the edges of the longitudinal walls of the upper and lower shells (154 and 156) nest within one another to join the upper and lower shells together. One end wall 162 of the modules 14 or 16, is configured to form a slot 164 for engaging with the tabular projections 110 of the base unit 12 when the module 14 or 16 is installed in the base unit recess 20 or 22. More particularly, as depicted in FIG. 7, the end wall 162 of the module upper shell 150 includes a notch 168 that is similar to the longitudinal wall notches 158 and traverses the full length of the lower edge of the end wall 162. The end wall 170 of the lower shell 152 is not notched to mate with the notch 168 and is dimensioned such that the slot 164 is formed between the edge of the upper shell end wall 162 and the upper edge of the lower shell end wall 170 with the lower edge of the upper shell end wall 162 extending below the edge of the upper shell end wall 170. In the case of a module 16, not having provision for a card reader 148, a similar arrangement is utilized to form a slot in the forward module end face for engaging with the ridges 118 of the base unit recesses 20 and 22 when a module 16 is installed in the base unit 12.

Figure 9:
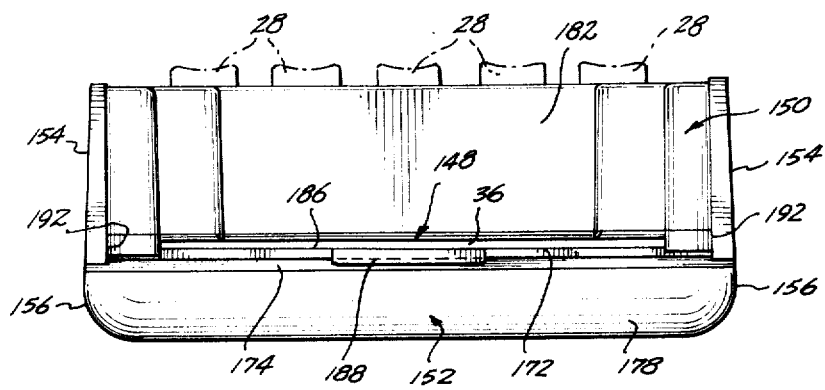

Referring to FIGS. 7 and 9, a slot for engaging a module 14 that includes a card reader 148 with the ridges 118 is formed in a somewhat different manner. In the depicted arrangement, a slot 174 for engaging with the ridges 118 is formed between the bottom surface 172 of the card reader exit opening 36 and a rectangular groove 176 in the lower shell end wall 178 of the module 14. More explicitly, the card reader 148 is generally rectangular in cross-section and extends transversely across the module 14 between the inner surfaces of the lower shell side walls 156. The end wall 182 of the upper shell 150 is contoured to define a finger recess (184, FIG. 6) that permits access to the card outlet 36. Effectively, in this arrangement, the portion of the card reader between the card outlet 36 and the lower shell end wall 178 forms a shelf or platform 186 for supporting punched cards as they emerge from the card outlet 36 so that the card can be easily grasped and pulled from the module 14. Further, in the situation wherein the card reader 148 is configured for reading cards or badges inserted in the card outlet 36 (for example, a card reader such as that disclosed in my previously referenced copending application), the platform 186 provides a convenient means for directing such a card or badge into the outlet 36. In any case, the card reader 148 preferably includes a downwardly extending flange 188 dimensioned to securely interconnect the card reader to the lower shell end wall 178. The flange 188 divides the slot 174 into two segments that extend from the lower shell side walls 156 to the edges of the flange 188.

Figure 10:
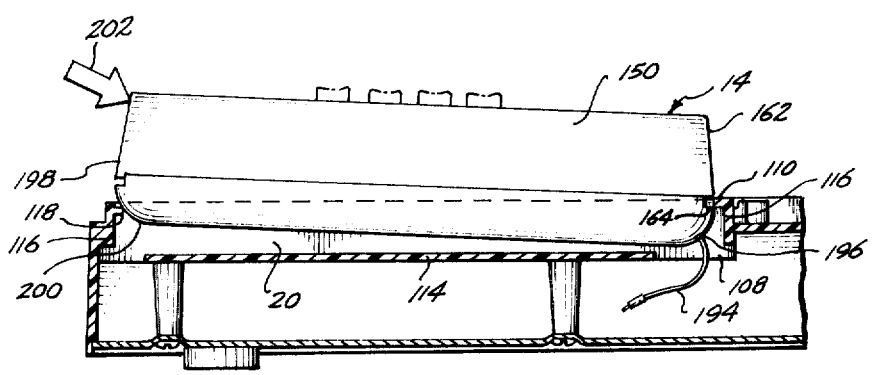
FIGS. 10 and 11 are partial side elevation views of the base unit of FIG. 2 and the module of FIG. 6 that illustrate the insertion of a module into a base unit.
Figure 11:
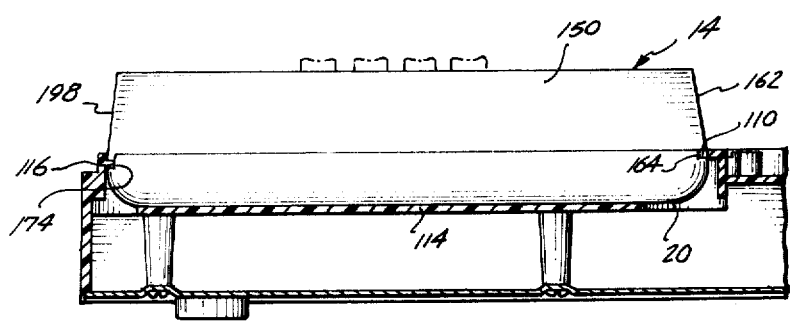

In view of the previously described structure of the base unit 12 and the modules 14 and 16, and with reference to FIGS. 10 and 11, the installation of a module 14 or 16 into the recess 20 or 22 of the base unit 12 can now be understood. Referring to FIG. 10, when a module 14 or 16 is to be placed in a recess 20 or 22 (FIGS. 10 and 11 depicting a module 14 being installed in a recess 20), a cable 194, providing the electrical interconnection between the module and the base unit 12 is inserted through an opening 108 in the recess bottom surface 114 and mated with an appropriate connector within the base unit 12. The module is then held such that the rear lower edge 196 of the module 14 is in contact with, or in close proximity to the bottom surface 114 of the recess 20, with the forward end 198 of the module being positioned above the upper surface of the recess 20. The module 14 is then moved rearwardly toward the rear end wall 106 of the recess 20 to enegage the slot 164 with the protrusion 110. As depicted in FIG. 10, when the protrusion 110 is fully engaged with the slot 164, the dimensioning of the recess 20 and the module 14 does not permit the module to freely pass into the recess 20 of the housing 12. In particular, the module 14 and the housing 12 are dimensioned and arranged such that the lower forward edge 200 of the module 14 strikes the ridge 118 that is located along the forward wall 116 of the recess 20. As denoted by the arrow 202 in FIG. 10, the module can be placed in the recess 20 only by pressing on the forward end 198 of the module 14. This pressure causes the protrusion 110 to press against and elastically deform or flex the end wall 162 of the module upper shell 150 which, as previously described, forms the rear boundary of the slot 164. As the end wall 162 is so deformed, the module 14 passes freely into the recess 20 and the ridges 118 come in alignment with, and engage the slot in the forward end 198 of the module (i.e., the slot 174 when a module 14 having a card reader is being installed, or a slot formed in the same manner as the slot 164 when a module 16 having no card reader is being installed). In either case, as a module passes into the recess and the insertion pressure is removed, the end wall 162 attempts to spring back to an undeformed condition. In the preferred embodiments of this invention, however, the relative dimensioning of the protrusion 110, the ridges 118 and the module slots 164 and 174 do not permit the end wall 162 to fully return to an undeflected condition. Rather, the module is maintained under a slight compressive force between the projection 110 and the ridges 118 to effectively lock the module into the installed position.

With respect to the construction of the end wall 162 to provide the desired deflection and restoring force to achieve operation as described above, it can first be recognized that, as shown in FIG. 7, the end wall 162 does not interlock with or contact the lower shell end wall 170. Thus, since the protrusion 110 contacts only the central portion of the end wall 162 the insertion force can readily flex or deform the end wall 162 in a manner similar to the flexing of a simple leaf spring. Additionally, the material is utilized for the fabrication of the modules 14 and 16 and the dimensioning of the end wall 162 can be advantageously selected to exhibit the desired deformation characteristic. In this respect, it has been found advantageous to injection mold the modules of the previously mentioned polycarbonate thermoplastic material.

As previously described, it is often necessary or desirable to utilize a data terminal such as the data terminal 10 in an application wherein the keyboard 26 of the module 14 is operated by unskilled personnel or by persons wearing relatively heavy gloves. In such a situation, the adjoining keys are often inadvertently depressed as the operator attempts to strike a particular key. To prevent the simultaneous depression of adjoining keys, the modular housing arrangement of this invention includes a removable bezel that can be mounted to the keyboard 26 of a module 14 to effectively physically separate adjoining keys from one another.

Figure 12:
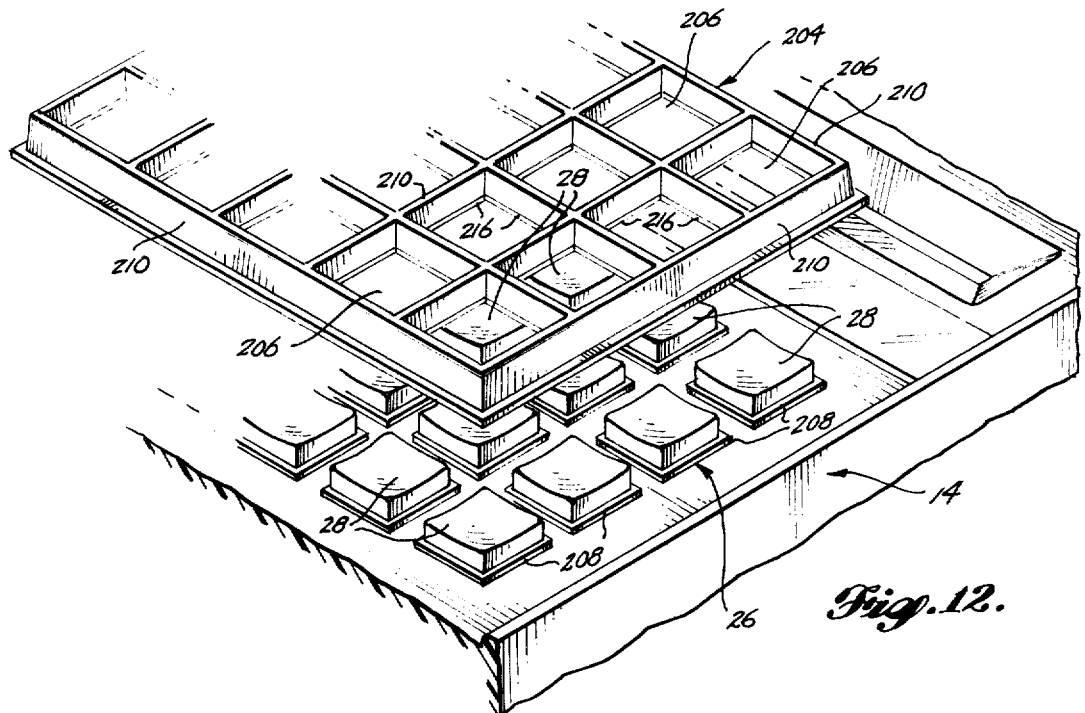
FIG. 12 is an isometric view of a bezel for preventing multiple key depression of a keyboard mounted to the module of FIG. 6.
Figure 13:
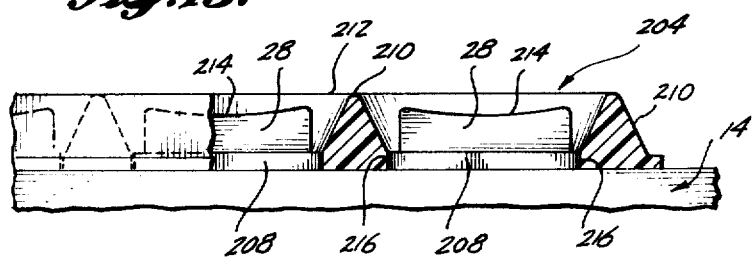
FIG. 13 is a cross-sectional view of the bezel of FIG. 12 mounted to a keyboard.

Referring now to FIGS. 12 and 13, the bezel 204, which is preferably molded of the previously mentioned polycarbonate thermoplastic material, forms a lattice-like rectangular array of openings 206 arranged in the same pattern as the keys 28 that comprise the keyboard 26. Each opening 206 is precisely dimensioned such that the bezel 204 will frictionally engage with a mounting frame 208 that surrounds each key 28 when the bezel is mounted to the keyboard 26. The spaced apart horizontal and vertical rails 210 that form the openings 206 are molded to have a generally triangular cross-section (FIG. 13) such that each opening 206 converges downwardly from a square finger opening in the upper surface of the bezel 206 to a square key opening at the lower surface of the bezel. The lower region of each rail 210 is formed such that each square key opening includes four walls 216 that effectively form a square passageway for frictionally engaging with the mounting frame 208 of each key 28. The height of the bezel 204 is dimensioned such that the upper surface 212 of the bezel 204 is positioned above the upper surface 214 of the keys 28 when the bezel is installed on the keyboard 26. Thus, the rails 210 effectively form a physical barrier separating the adjoining keys 28 from one another to prevent the operator's finger from simultaneously depressing two adjoining keys 28. Since the interstitial openings 206, formed between the rails 210, converge downwardly toward the upper surface of each key 28, the operator's finger is effectively guided to the upper surface of the desired key even though the operator may be wearing heavy gloves.

Figure 14:
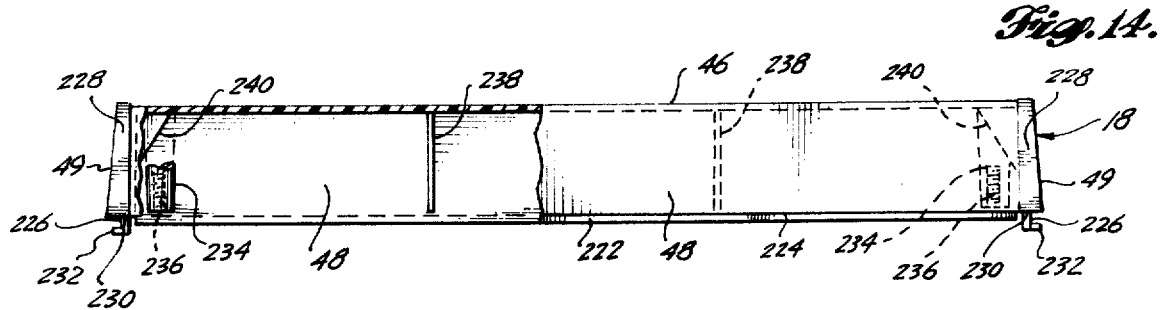
FIG. 14 is a front elevation view, in partial cross-section, illustrating the rear cover unit of FIG. 1.
Figure 15:
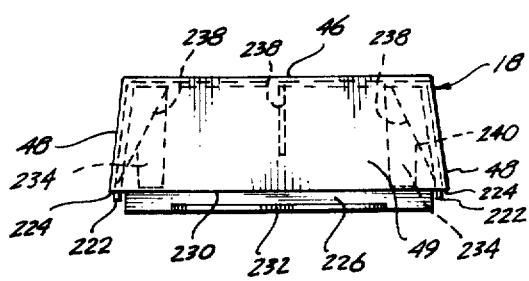
FIG. 15 is a side elevation view of the rear cover unit of FIG. 14.

Referring to FIGS. 14 and 15, the modular cover unit 18 is a molded shell having an upper surface 46, two oppositely disposed longitudinal side walls 48, and two oppositely disposed end walls 49. In the depicted arrangement, the longitudinal sidewalls 48 slope downwardly such that each end wall 49 has a trapezoidal shape. A small ridge 222, having a generally rectangular cross-section, extends downwardly from the lower edge surface 224 of each longitudinal side wall 48. The ridge 222 is dimensioned to fit within the slots 134 formed between the posts 130 and the longitudinal walls of the rear housing recess 100 (FIG. 2) when the cover unit 18 is installed to the base unit 12.

The lower portion of each sidewall 49 projects downwardly between the ridges 222 to form a slot 226 for engaging with the projections 130 of the base unit rear recess 100. More explicitly, in the depicted embodiment, each end wall 49 is molded to extend outwardly beyond the surfaces of each sidewall 48 to form a corner protrusion 228. As viewed perpendicular to the side walls 48 (FIG. 14) each corner protrusion 228 is shaped somewhat like a truncated triangle. The central region of each end wall 49 projects downwardly from the bottom surface 230 of each protruding corner 228 and includes a flange 232 that projects orthogonally outward and substantially parallel to the bottom surface 230 to form the slot 226 as a rectangular groove substantially parallel to the lower edge of each end wall 49.

The modular cover unit 18 is installed to the base unit 12 by engaging the slot 226 in one of the end walls 49 with one of the tabular projections 130 of the base unit recess 100. The opposite end wall 49 is then pressed firmly toward the engaged tabular projection 130 to slightly deform the longitudinal walls 48 of the cover unit 18. With the cover unit 18 slightly deformed, the flange 232 in the end wall 49 not engaged with the tabular projection 130 passes by the second tabular projection 130. When the pressure is released, the modular cover unit 18 springs back into shape to engage the second tabular projection 130 with the adjoining slot 226. As in the case of the installation of the modules 14 and 16, the cover unit 18 and the base unit recess 100 are preferably dimensioned such that the modular cover unit 18 is not permitted to fully spring back into an undeformed configuration, but engages with the tabular projections 130 to maintain the rear cover under a slight compressive force. As the cover unit 18 is installed, the lower edges of the longitudinal side walls 48 pass into the slots 134 provided in the posts 132 (FIGS. 2 and 3) and frictionally engage with the slots 134 to retain the rear cover unit 18 in the proper position.

As previously described, the modular cover unit 18 can include a number of screwposts 234 to facilitate more permanent attachment of the rear cover unit 18 to the base unit 12 for preventing unauthorized removal of the cover unit. As depicted in FIGS. 14 and 15, the screwposts 234 are preferably integral molded portions of the modular cover unit 18 that extend orthogonally downwardly from the upper surface 46 of the cover unit 18. Each screwpost 234 is located in the interior region of the cover unit 18 near the cover unit corners 228 and includes an internally threaded opening 236. When the cover unit 18 is installed to the base unit 12, each screwpost 234 is in alignment with a screwpost 136 that is contained within the recess opening 100 (FIGS. 2 and 3). The screwposts 234 are of a length that causes the lower surface of the screwpost to abut the upper surface of the associated screwpost 136 such that screws can be installed through the screwposts 136 to engage with the threaded openings 236 of the screwposts 234.

As in the case of the configuration of modules 14 and 16, the modular cover unit 18 is advantageously constructed and arranged to exhibit deformation characteristics which effect the previously described mounting of the rear cover unit to the base unit 12. In this respect, it has been found advantageous to injection mold the rear cover unit of the previously described polycarbonate thermoplastic material. In addition, the desired longitudinal stiffness can be further achieved by including small stiffening webs between each of the cover unit walls 48 and 49 and the rear cover upper surface 46. In the rear cover unit 18 depicted in FIGS. 14 and 15, stiffening webs 238 are integrally molded between each end wall 49 and the rear cover unit upper surface 46 at a position near the center of the end walls 49. Additionally two stiffening webs 238 are substantially equally spaced along each longitudinal side wall 48 to join the side wall with the rear cover upper surface 46. Each stiffening web 238 is relatively thin and projects orthogonally inwardly from the associated wall surface and orthogonally downwardly from the upper surface 46. When viewed perpendicular to the surface of the stiffening web, each web 238 is substantially triangular in shape, the edge 240 of the stiffening web that is not contiguous with the associated wall (48 or 49), or contiguous with the upper surface 46, extending angularly between the surface of the associated wall and the rear cover upper surface 46.

Figure 16:
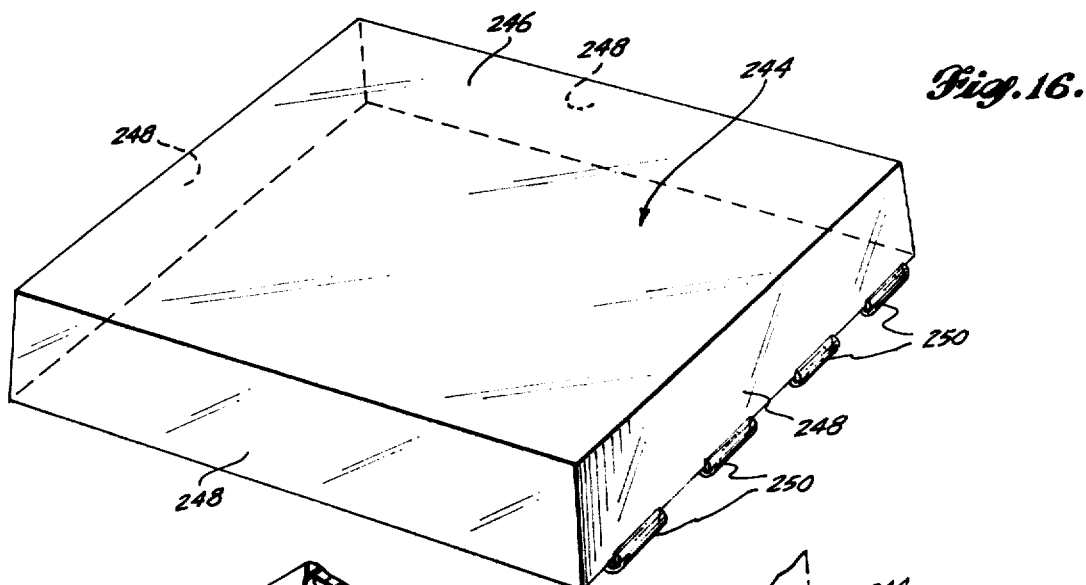
FIG. 16 is an isometric view of a dust cover mountable to the base unit of the embodiment of this invention depicted in FIG. 1.

Referring now to FIG. 16, the dust cover 244, which is mountable to the base unit 12 for protecting the data terminal 10 during periods of nonuse, includes an upper panel 246 and four side panels 248. The side panels 248 extend downwardly from each edge of the upper panel 246 with the rectangular opening formed between the lower edges 252 of the side panels 248 being dimensioned to rest on the outer edges of the rectangular upper surface 62 of the base unit 12.

Four hinge straps 250 for engaging with the hinge rod 56 of the base unit 12 are spaced along the lower edge 252 of one of the side panels 248. When viewed in cross-section (FIGS. 20-22), each hinge strap 250 has a curved hook-shaped geometry, with the inner radius thereof being dimensioned commensurate with the circular hinge rod 56 of the base unit 12.

Figure 17:
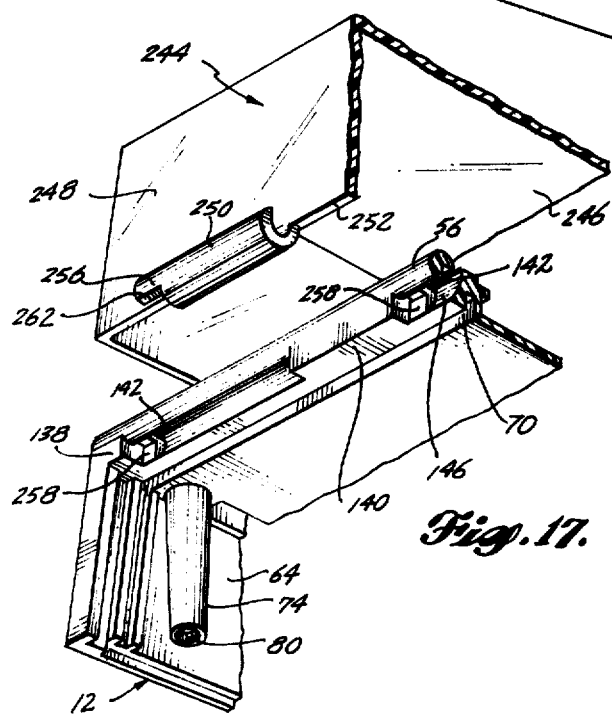
FIG. 17 is an isometric view of a portion of the dust cover of FIG. 16 and a portion of the base unit of FIG. 2 that illustrates the hinge arrangement of this invention for mounting the dust cover for the base unit.

Referring to FIG. 17, which depicts a hinge strap 250 of the dust cover 244 in juxtaposition with a portion of the base unit 12 that includes the hinge rod 56, it can be seen that the length of each hinge strap 250 is dimensioned for insertion in one of the slots 144 formed between the hinge rod support blocks, e.g., the end support 138 and the support block 140 depicted in FIG. 17. One end of each hinge strap 250 includes a rectangular notch 254 along the lower edge 252 of the dust cover 244. As shall be described in more detail hereinafter, the notches 254 define a hinge strap detent 256 which cooperates with a hinge rod detent 258, formed in the hinge rod supports 138 and 140, for maintaining an installed dust cover 244 in a predetermined open position.

Figure 20:
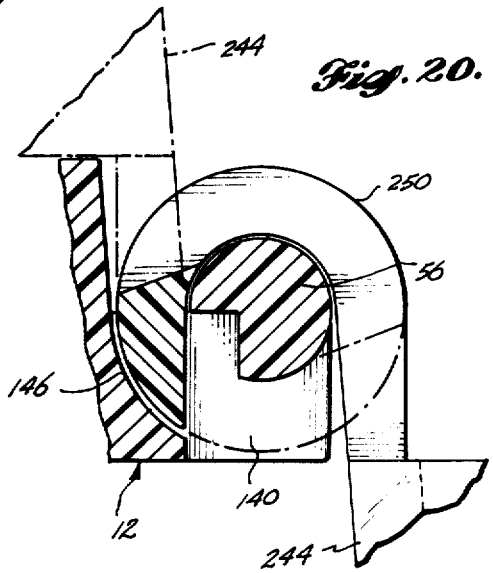
FIG. 20 is a cross-sectional view of the hinge arrangement of FIG. 17 depicting the installation of the dust cover of FIG. 16 on the base unit depicted in FIG. 2.
Figure 18:
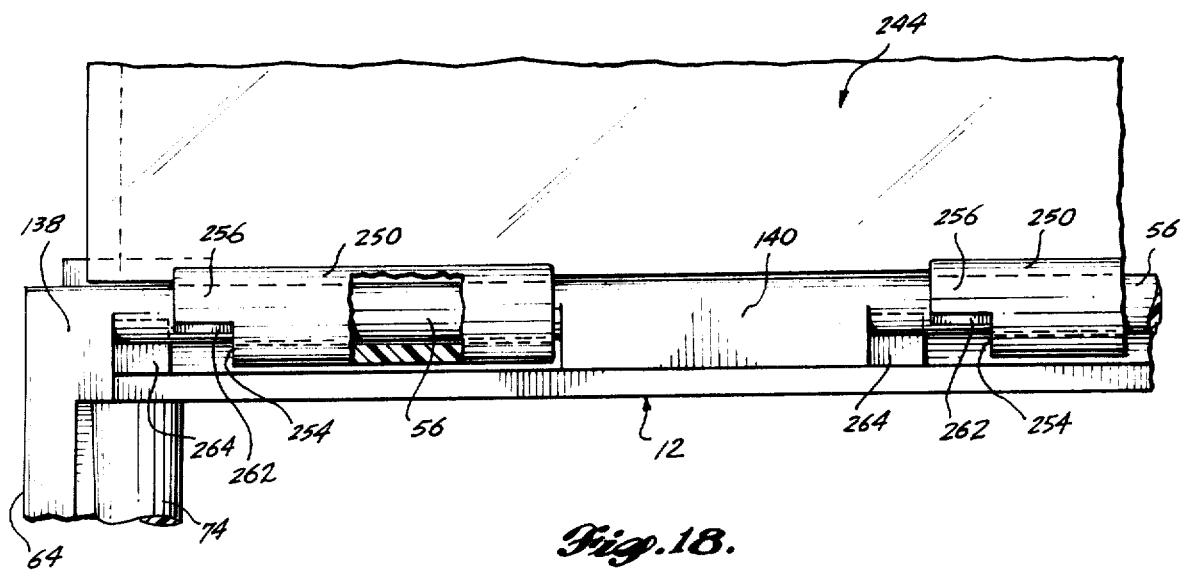
FIGS. 18 and 19 are partial rear elevation views of the hinge arrangement of FIG. 17 illustrating the installation of the dust cover of FIG. 16 on the base unit depicted in FIG. 2.
Figure 19:
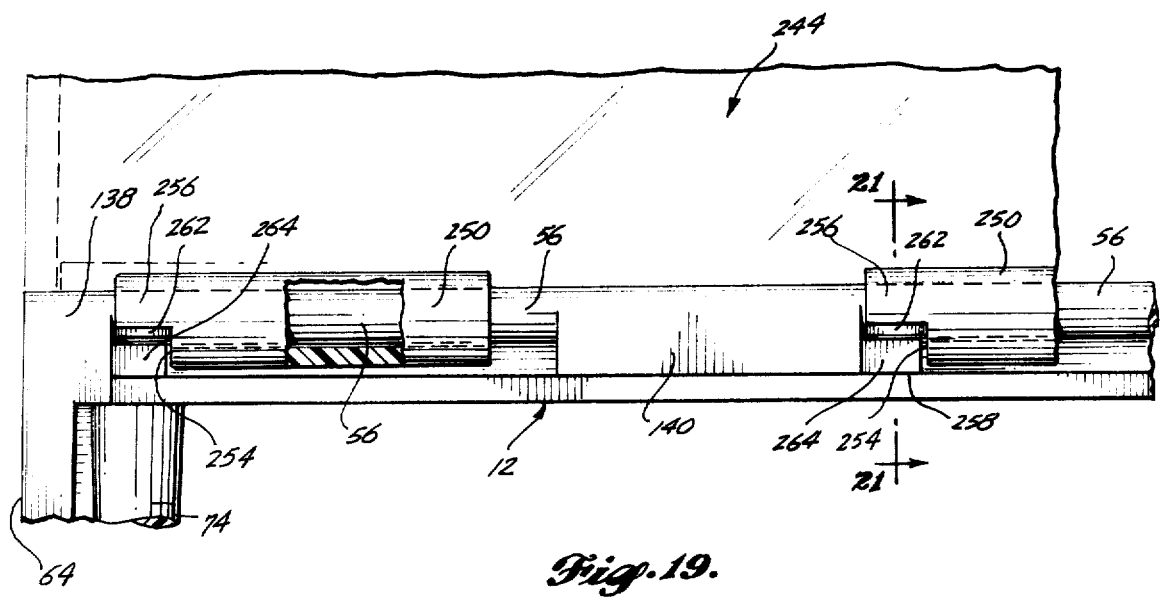

Referring now to FIGS. 18-20, the dust cover 244 is installed to the hinge rod 56 of the base unit 12 by inserting each hinge strap 250 into the slots 144 such that the hook shaped hinge straps engage the hinge rod 56 of the base unit 12 (FIG. 20). With the dust cover 244 so positioned, the front panel 248 of the dust cover is swung upwardly such that the hinge straps 250 rotate through the curved openings 144 that are formed between the hinge rod 56 and the adjoining radiused wall 146 of the base unit (as shown by the phantom lines in FIGS. 20).

When the dust cover 244 is swung upwardly in this manner, the dust cover longitudinal side panels 248 are not in alignment with the longitudinal side walls 64 of the base unit 12 (FIG. 18), but are offset by an amount substantially equal to the depth of the hinge strap notch 254. To place the dust cover 244 in proper alignment with the base unit 12, and to position the hinge strap detent 256 relative to the hinge rod detent 258, the dust cover 244 is slid along the hinge rod 56 until the hinge strap detent 256 is in alignment with the hinge rod detent 258 (FIG. 19). At this point, the hinge cover is fully engaged with the base unit 12 and is in the closed position.

Figure 21:
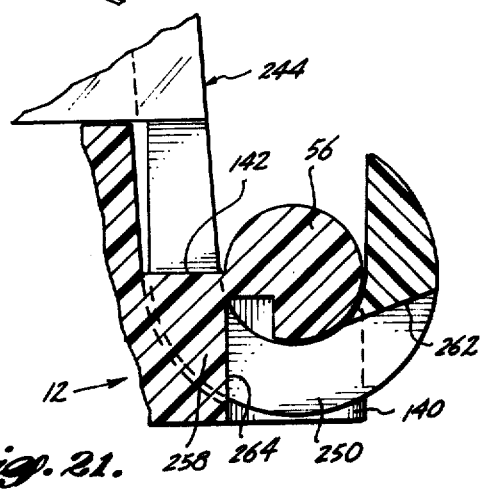
FIGS. 21 and 22 are cross-sectional side views of the hinge that interconnects the dust cover and the base unit, taken along the line 21—21 of FIG. 19, which illustrate the opening and closure of the dust cover.
Figure 22:
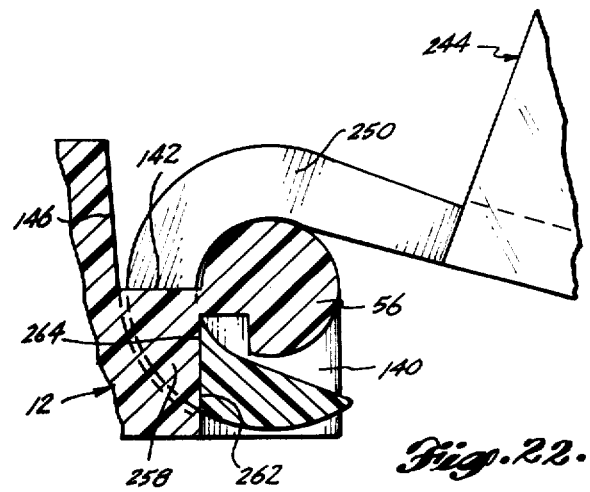

As can be seen in FIG. 19, and as is more clearly depicted in FIG. 21, when the hinge cover is so engaged with the base unit 12, a stop face 262 in each hinge strap detent 256 is positioned directly above the downwardly extending rear surface 264 of the hinge rod detent 258. The stop face 262 is a substantially flat surface that forms an obtuse angle relative to the substantially vertical rear surface 264 of the hinge rod detent 258. Thus, when the dust cover 244 is opened by swinging the dust cover upwardly about the mated hinge rod 56 and the hinge straps 250, the stop face 262 comes into abutment with the hinge rod detent rear surface 264 to stop the dust cover in a predetermined position in which the dust cover lower edge 252 forms an obtuse angle relative to the base unit upper surface 62. Since the detents 256 and 258 stop the dust cover 244 after the dust cover has passed through a vertical position, the dust cover 244 will remain open even though the base unit 12 may be supported on a slightly inclined surface or subjected to mechanical forces such as vibration. For example, in one embodiment of the invention, the stop faces 262 are configured to cause the open dust cover to be inclined at approximately 110° with respect to the upper surface 62 of the base unit 12.

As can be ascertained from the previous description and FIGS. 18-22, if it is desirable to remove the dust cover 244, such removal is effected by partially closing the dust cover, sliding the dust cover sideways along hinge rod 56 to disengage the detents 256 and 258, and rotating the dust cover about the hinge rod 56 to disengage the hinge straps 250 from the slots 144.

It will be recognized by those skilled in the art that the embodiment of the invention disclosed herein is exemplary in nature and that many variations therein can be practiced without departing from the scope and spirit of this invention. For example, although the invention is disclosed as a housing unit for a data terminal, the invention can be utilized for containing a great variety of modularized electronic equipment. Further, although the depicted housing arrangement includes two modules (14 and 16), and a rear cover unit 18 interconnected with a base unit 12, any convenient number of modules and cover units can be employed.

What is claimed is:

1. A modular housing unit for the mounting of electronic apparatus comprising:
a base unit configured for containing electronic apparatus, said base unit including an upper surface defining at least one rectangular opening therein, each of said rectangular openings including first and second sidewalls located along oppositely disposed edges of each of said rectangular openings, said first and second sidewalls extending downwardly from said upper surface of said base unit, said first sidewall of each of said rectangular openings including a tabular projection extending from said first sidewall toward the central region of said rectangular opening, said tabular projection being substantially coplanar with said upper surface of said base unit, said second sidewalls of each of said rectangular openings including a ridge extending from said second sidewall toward the central region of said rectangular opening, each of said ridges being substantially parallel to said upper surface of said base unit, the ridge and tabular projection of each of said rectangular openings being dimensional to establish a predetermined distance between those boundaries thereof that are positioned most proximate to the central region of said rectangular opening; and at least one module configured for containing electronic apparatus, each of said modules having two oppositely disposed sidewalls including a slot transversely positioned along each of said oppositely disposed sidewalls, the first one of said slots being dimensioned for engagement with said tabular projection of said rectangular opening of said base unit, the second one of said slots being dimensioned for engagement with said ridge of said rectangular opening of said base unit, the distance between the outer surfaces of said sidewalls of each of said modules being greater than said predetermined distance between said tabular projection and said ridge of each of said rectangular openings of said base unit by an amount sufficient to prevent insertion of one of said modules in one of said rectangular openings when said module is forced downwardly with said slots of said module sidewalls substantially parallel to said ridge and tabular projection of said rectangular opening of said base unit, said module being insertable within said base unit rectangular opening by engaging said first one of said slots in said module sidewall with said tabular projection of said base unit and exerting a force on that sidewall including said second one of said slots to cause said module to elastically deform and enter said base unit rectangular opening, said second slot of said module sidewall slots engaging with said ridge of rectangular opening when said force is removed from said module side wall, said tabular projection and said ridge subjecting said module to a compressive force exerted between said slotted sidewalls to securely retain said module within said rectangular opening.

2. The modular housing unit of claim 1 further comprising a removable dust cover for enclosing said upper surface of said base unit including each of said rectangular openings, said base unit and said dust cover arranged to form a hinge for pivotably connecting said dust cover to said base unit, said dust cover swingable about said hinge from a first position for enclosing said base unit upper surface to a second position for exposing said base unit upper surface.

3. A modularized housing unit for containing electronic apparatus wherein a plurality of component housings are structurally connectable with one another to form said modular housing unit, said modular housing unit comprising:

a base unit having an upper surface including first and second recesses for receiving and retaining selected ones of said component housings, said first and second recesses respectively defining first and second substantially rectangular openings in said base unit upper surface, each longitudinal edge of said first and second rectangular openings being substantially parallel to one another, said base unit upper surface defining a tabular projection along the central portion of each of the first minor edges of said first and second rectangular openings, each of said tabular projections being substantially coplanar with said base unit upper surface and extending a predetermined distance inwardly toward the central region of said rectangular opening, each of said first and second recesses including a forward sidewall extending downwardly from the second minor edge of each of said first and second rectangular openings, each of said forward sidewalls including a ridge extending substantially parallel to and spaced apart from said upper surface of said base unit, said ridge projecting inwardly toward the central region of said first and second recesses to establish a predetermined distance between the inwardly positioned boundary of said ridge and the inwardly positioned boundary of said tabular projection; and at least one module configured for insertion and retention within said first and second recesses of said base unit, each of said modules having substantially rectangular spaced apart front and rear surfaces, first and second spaced apart longitudinal side walls, and first and second spaced apart end walls to form a substantially closed housing for containing electronic apparatus, said first end wall including a first slot configured for the insertion of said tabular projection of said base unit first and second recesses, said second end wall of said module including a second slot configured for engaging with said ridges of said base unit first and second recesses, said module being so configured and so arranged such that at least one of said first and second end walls can be elastically deformed toward the other of said end walls by forces applied to the central portion of each of said first and second sidewalls, each of said modules being dimensioned and arranged such that the distance between the outer surfaces of said first and second end walls exceeds said predetermined distance established between the inwardly positioned boundaries of said ridge and said tabular projection of each of said first and second recesses of said base unit, each of said modules being installable within said first and second recesses of said base unit by engagement of said first slot with said tabular projection of said base unit recess and applying a force to said second end wall of said module to elastically deform at least one of said first and second end walls of said module and cause said module second end wall to pass by said base unit ridge, said base unit ridge engaging with said second slot in said second end wall of said module when said deformation force is removed.

4. The modularized housing unit of claim 3 wherein said rectangular upper surface of said base unit includes a third recessed region for receiving and containing selected ones of said component housings, said third recessed region defining a third substantially rectangular opening in said base unit upper surface, said base unit upper surface defining a tabular projection along the central portion of each minor edge of said third rectangular opening, said tabular projections extending inwardly a predetermined distance toward the central region of said third rectangular opening, said modularized housing unit further comprising a cover unit arranged for installation in said third rectangular recess, said cover unit having a rectangular upper surface, first and second side walls extending downwardly from the longitudinal edges of said cover unit rectangular upper surface, and first and second end walls extending downwardly from the minor edges of said cover unit rectangular upper surface, each of said end walls extending downwardly beyond the lower terminating edge of said side walls, that portion of each of said end walls extending downwardly beyond said terminating edge of said side walls including a rectangular slot for engagement with said tabular projections of said base unit third rectangular opening, said cover unit being so dimensioned and so arranged relative to the dimensions of said third recess of said base unit such that said cover unit is installable to said base unit by engaging the slot in said first end wall with one of said tabular projections of said third recess and elastically deforming said cover unit by forcing said second end wall toward said first end wall to cause the slot of said second end wall to engage with the second one of said tabular projections.

5. The modularized housing unit of claim 4 wherein said third recessed region includes first and second longitudinal side walls respectively extending downwardly into said third recessed region along the longitudinal edges of said third rectangular opening, said first and second recess walls including a plurality of posts spaced along each of said first and second recess walls with each of said posts extending upwardly toward said third rectangular opening, each of said posts having an end face substantially perpendicular to said downwardly extending first and second recess walls, each of said end faces including a slot formed between said post and said downwardly extending first and second recess wall, each of said slots dimensioned for frictionally engaging the lower portion of said cover unit first and second downwardly extending side walls when said cover unit is installed in said base unit third recess.

6. The modularized housing unit of claim 3 wherein at least one of said modules configured for insertion in said first and second recesses of said base unit includes a manually operable keyboard having a plurality of keys arranged in a predetermined geometric array, each of said keys projecting orthogonally upward from said front surface of said module with each of said keys surrounded by a stationary mounting flange projecting orthogonally upward from said module front surface, said modularized housing unit further comprising a removable bezel for physically separating adjoining ones of said keys from one another to prevent simultaneous depression of said adjacent keys, said bezel having an upper surface and a lower surface each having a plurality of openings arranged in the same predetermined geometry as said array of keys, each opening in said bezel lower surface interconnected with an opening in said bezel upper surface to form a plurality of passageways between said upper and lower surfaces of said bezel, each of said passageways converging downwardly with a region of each passageway adjacent said lower bezel surface being dimensioned for frictionally engaging said stationary mounting flanges of said keys when said bezel is installed to said module, the distance between said upper and lower bezel surfaces being dimensioned to position the upper surface of said bezel above the upper surface of said keys.

7. The modularized housing unit of claim 3 further comprising a removable dust cover mountable to said base unit, said dust cover swingable from a closed position for enclosing said upper surface of said base unit to an open position to expose said upper surface of said modular housing unit when said dust cover is mounted to said base unit, said dust cover including an upper surface and four downwardly extending sidewalls, an upper boundary edge of each of said sidewalls being joined to a boundary edge of said dust cover upper surface with said sidewalls being joined to one another along each intersection of one of said sidewalls with another of said sidewalls, the lower boundary of a first one of said sidewalls being formed to define a portion of a hinge for removably mounting said dust cover to said base unit, said portion of said hinge including a plurality of spaced apart hinge straps, each of said hinge straps of predetermined width and formed radially upward to project rearwardly beyond the rear surface of said first sidewall, the terminating end of each of said hinge straps being spaced apart from and substantially parallel to said rear surface of said first sidewall, each of said hinge straps radiused so that the interior surface of said hinge strap defines an opening of substantially circular cross-sectional geometry;

said base unit further including a hinge rod mounted to extend rearwardly from and substantially parallel to one edge of said base unit rectangular upper surface, said edge of said base unit including a plurality of spaced apart support blocks connecting said hinge rod to said base unit, each of said support blocks projecting upwardly from said base unit edge to join said hinge rod with said edge of said base unit, the spaces between said spaced apart support blocks being dimensioned and arranged for receiving said plurality of hinge straps of said removable dust cover, said plurality of hinge straps being engageable with said base unit hinge rod by inserting said hinge straps through said spaces between said support blocks and rotating said dust cover toward said upper surface of said base unit to encompass at least a portion of said hinge rod with said hinge straps.

8. The modularized housing unit of claim 7 wherein said base unit support blocks include a first detent for maintaining said dust cover in a predetermined open position wherein the upper surface of said dust cover forms an obtuse angle with said upper surface of said base unit, each of said first detents being integrally formed in said support blocks and projecting inwardly into one of said openings formed between said spaced apart support blocks, each of said first detents having a rear face, said rear face extending downwardly and spaced apart from said circular hinge rod, each of said dust cover hinge straps having a notch positioned adjacent to said lower boundary edge of said first sidewall of said dust cover with each of said notches defining a second hinge detent, said second hinge detent being the portion of said hinge strap that extends between said notch and said terminating edge of said hinge strap, said dust cover hinge straps and said base unit support blocks being dimensioned and arranged relative to one another such that said dust cover does not align with said upper surface of said base unit when said hinge straps are inserted through said spaces between said support blocks and said dust cover is rotated upwardly toward said upper surface of said base unit, said dust cover being positionable in alignment with said upper surface of said base unit by sliding said dust cover along said hinge rod to position said first hinge detents of said base unit support blocks in said notches of said dust cover hinge straps, the boundary face of said notch defined by said portion of said hinge strap that extends between said notch and said terminating edge of each of said hinge straps coming into abutment with said rear faces of said first detents to maintain said dust cover in said predetermined open position when said dust cover is aligned with said upper surface of said base unit and said dust cover is swung upwardly to expose said upper surface of said base unit.

9. A hinge for mounting a removable cover panel to a housing unit comprising:

a plurality of hinge straps formed as an integral portion of said cover panel, each of said hinge straps being spaced apart from one another along one edge of said cover panel, each of said hinge straps being of hook-shaped cross-sectional geometry with each of said hinge straps extending downwardly from said edge of said cover panel and then curving smoothly upwardly toward said cover panel, each of said hinge straps including a terminal edge substantially parallel to and spaced apart from said edge of said cover panel, each of said hinge straps further including a substantially rectangular notch having first and second mutually opposed boundary surfaces, said first boundary surface being defined by said edge of said cover panel, said second boundary surface of said notches being defined by a region of said hinge strap contiguous to said hinge strap terminal edge and extending in a direction parallel to said edge of said cover panel, said second boundary surface of said notch being contoured to define a first detent; and a substantially circular hinge rod mounted to extend outwardly from one edge of said housing unit, said edge of said housing unit including a plurality of spaced apart support blocks connecting said hinge rod to said housing unit with said hinge rod substantially parallel to said edge of said housing unit, the openings between spaced apart support blocks being dimensioned and arranged for receiving said hinge straps of said removable cover panel, said housing unit support blocks each including a second detent said second detents extending outwardly into said openings between said spaced apart support blocks, each of said second detents having a rear face extending substantially downwardly relative to said circular hinge rod, said plurality of hinge straps being engageable with said housing unit hinge rod by inserting said terminal edges of said hinge straps through said spaces between said support blocks and rotating said cover panel toward said housing unit to at least partially encompass said hinge rod with said hook-shaped hinge straps, said cover panel being positionable to slide said hinge straps along said hinge rod to position each of said second boundary surface of each of said notches of hinge straps in spaced juxtaposition with one of said rear faces of said second detents, said second boundary surface of each of said hinge straps coming into abutment with said juxtaposed rear face of one of said second detents when said cover panel is swung away from said housing unit about said hinge to support said cover unit in a predetermined open position.

* * * * *